US012619443B2

(12) United States Patent
Kennedy et al.

(10) Patent No.: US 12,619,443 B2
(45) Date of Patent: May 5, 2026

(54) SYSTEMS AND METHODS FOR SHARED AND SCALABLE DISPLAY CONTROLLER WITHOUT PERIPHERAL COMPONENT INTERCONNECT INTERFACE

(71) Applicant: Dell Products L.P., Round Rock, TX (US)

(72) Inventors: Jeffrey L. Kennedy, Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/675,447

(22) Filed: May 28, 2024

(65) Prior Publication Data

US 2025/0370762 A1 Dec. 4, 2025

(51) Int. Cl.
*G06F 9/4401* (2018.01)
*G06F 11/22* (2006.01)
*G06F 11/32* (2006.01)
*G06F 13/40* (2006.01)
*G06F 13/42* (2006.01)

(52) U.S. Cl.
CPC .......... *G06F 9/4406* (2013.01); *G06F 9/4401* (2013.01); *G06F 11/2284* (2013.01); *G06F 11/321* (2013.01); *G06F 13/4022* (2013.01); *G06F 13/4282* (2013.01); *G06F 2213/0042* (2013.01)

(58) Field of Classification Search
CPC ........ G06F 3/14; G06F 9/4401; G06F 9/4405; G06F 9/4406; G06F 11/2284; G06F 11/321; G06F 13/4022; G06F 13/4282; G06F 2213/0042
See application file for complete search history.

(56) References Cited

U.S. PATENT DOCUMENTS

| | | | | |
|---|---|---|---|---|
| 6,487,669 | B1 * | 11/2002 | Waring ................... | G09G 5/393 |
| | | | | 713/324 |
| 10,152,442 | B2 * | 12/2018 | Bowers ................. | G06F 13/387 |
| 10,997,687 | B1 * | 5/2021 | Guerra ..................... | G09G 5/10 |
| 2002/0097234 | A1 * | 7/2002 | Sauber .................. | G06F 3/1438 |
| | | | | 345/204 |
| 2009/0248924 | A1 * | 10/2009 | Melin ..................... | H04L 12/66 |
| | | | | 710/63 |
| 2010/0318704 | A1 * | 12/2010 | Siulinski ............. | H04L 12/2803 |
| | | | | 710/316 |

(Continued)

OTHER PUBLICATIONS

"RS-232 Frequently Asked Questions". Application Report SLLA544. Jan. 2021. Texas Instruments, Inc. (Year: 2021).*

*Primary Examiner* — Thomas J. Cleary

(74) *Attorney, Agent, or Firm* — Jackson Walker L.L.P.

(57) ABSTRACT

An information handling system may include a host system configured to boot an operating system and a management controller communicatively coupled to the host system and configured to provide management facilities for management of the host system. The management controller may further configured to, during a power-on/self-test of the host system, in concert with a basic input/output system of the host system, perform a handshake to transition a port of the information handling system from a host system-owned port to a management controller-owned port and take ownership of the port for redirection of input to a serial console of the management controller.

19 Claims, 2 Drawing Sheets

(56) References Cited

U.S. PATENT DOCUMENTS

| | | | |
|---|---|---|---|
| 2016/0104460 A1* | 4/2016 | Kiichle-Gross | G09G 5/393 |
| | | | 345/547 |
| 2021/0034452 A1* | 2/2021 | Tan | G06F 9/4403 |
| 2021/0089326 A1* | 3/2021 | Banik | G06F 1/263 |
| 2022/0068242 A1* | 3/2022 | Maloney | G09G 5/363 |
| 2022/0413857 A1* | 12/2022 | Nicholas | G06F 13/382 |
| 2023/0099385 A1* | 3/2023 | Michna | G06F 13/4022 |
| | | | 348/705 |

* cited by examiner

SYSTEMS AND METHODS FOR SHARED AND SCALABLE DISPLAY CONTROLLER WITHOUT PERIPHERAL COMPONENT INTERCONNECT INTERFACE

TECHNICAL FIELD

The present disclosure relates in general to information handling systems, and more particularly to methods and systems for providing a shared and scalable display controller without a peripheral component interconnect (PCI) interface.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Dense computing architectures (e.g., a server rack having multiple modular information handling systems) may benefit significantly from multi-node management using a single management controller. Using traditional approaches, a management controller (e.g., a baseboard management controller) may require a Peripheral Component Interconect Express (PCIe) endpoint within the application-specific integrated circuit for each host node managed by the management controller for the purpose of a video controller function. Integrated circuit die area and input/output pins available on a management controller may not be able to scale to many host nodes. Further, licensing costs for video controllers may be very expensive and may be required for each independent node which is managed.

SUMMARY

In accordance with the teachings of the present disclosure, the disadvantages and problems associated with existing approaches for providing video control in an information handling system may be reduced or eliminated.

In accordance with embodiments of the present disclosure, an information handling system may include a host system configured to boot an operating system and a management controller communicatively coupled to the host system and configured to provide management facilities for management of the host system. The management controller may further configured to, during a power-on/self-test of the host system, in concert with a basic input/output system of the host system, perform a handshake to transition a port of the information handling system from a host system-owned port to a management controller-owned port and take ownership of the port for redirection of input to a serial console of the management controller.

In accordance with these and other embodiments of the present disclosure, a method may be provided for use in an information handling system comprising a host system configured to boot an operating system and a management controller communicatively coupled to the host system and configured to provide management facilities for management of the host system. The method may include during a power-on/self-test of the host system, in concert with a basic input/output system of the host system, performing, by the management controller, a handshake to transition a port of the information handling system from a host system-owned port to a management controller-owned port, and taking ownership, by the management controller, of the port for redirection of input to a serial console of the management controller.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in a management controller communicatively coupled to the host system and configured to provide management facilities for management of the host system and during a power-on/self-test of the host system, in concert with a basic input/output system of the host system, perform a handshake to transition a port of an information handling system that includes the host system and the management controller from a host system-owned port to a management controller-owned port, and take ownership, by the management controller, of the port for redirection of input to a serial console of the management controller.

In accordance with these and other embodiments of the present disclosure, a method may be provided for use in an information handling system comprising a host system configured to boot an operating system and a management controller communicatively coupled to the host system and configured to provide management facilities for management of the host system. The method may include displaying, by the management controller, video output to a display device coupled to the information handling system during three different host states of the host system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
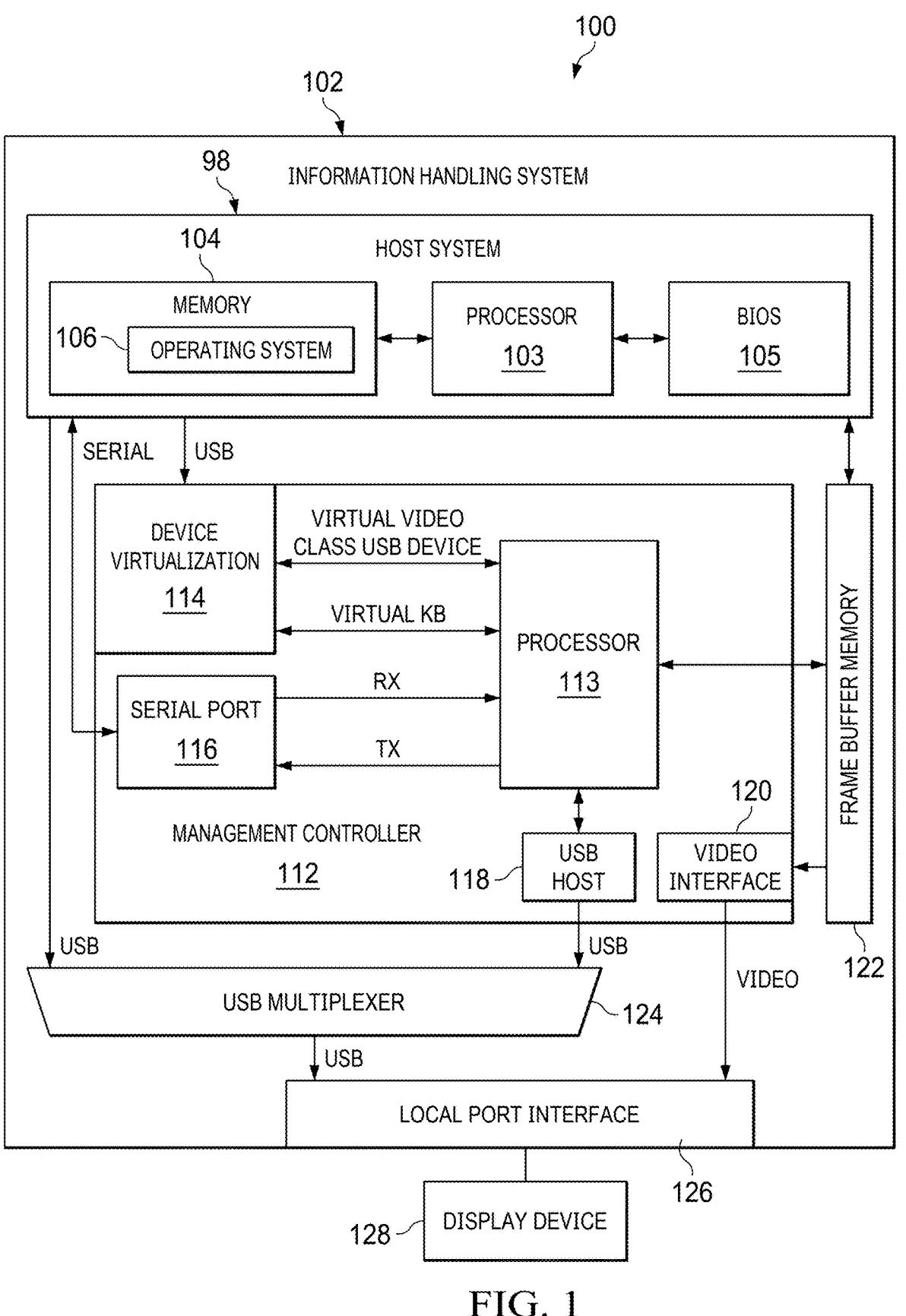
FIG. 1 illustrates a block diagram of an example system comprising an information handling system and a display device, in accordance with embodiments of the present disclosure.
Figure 2:
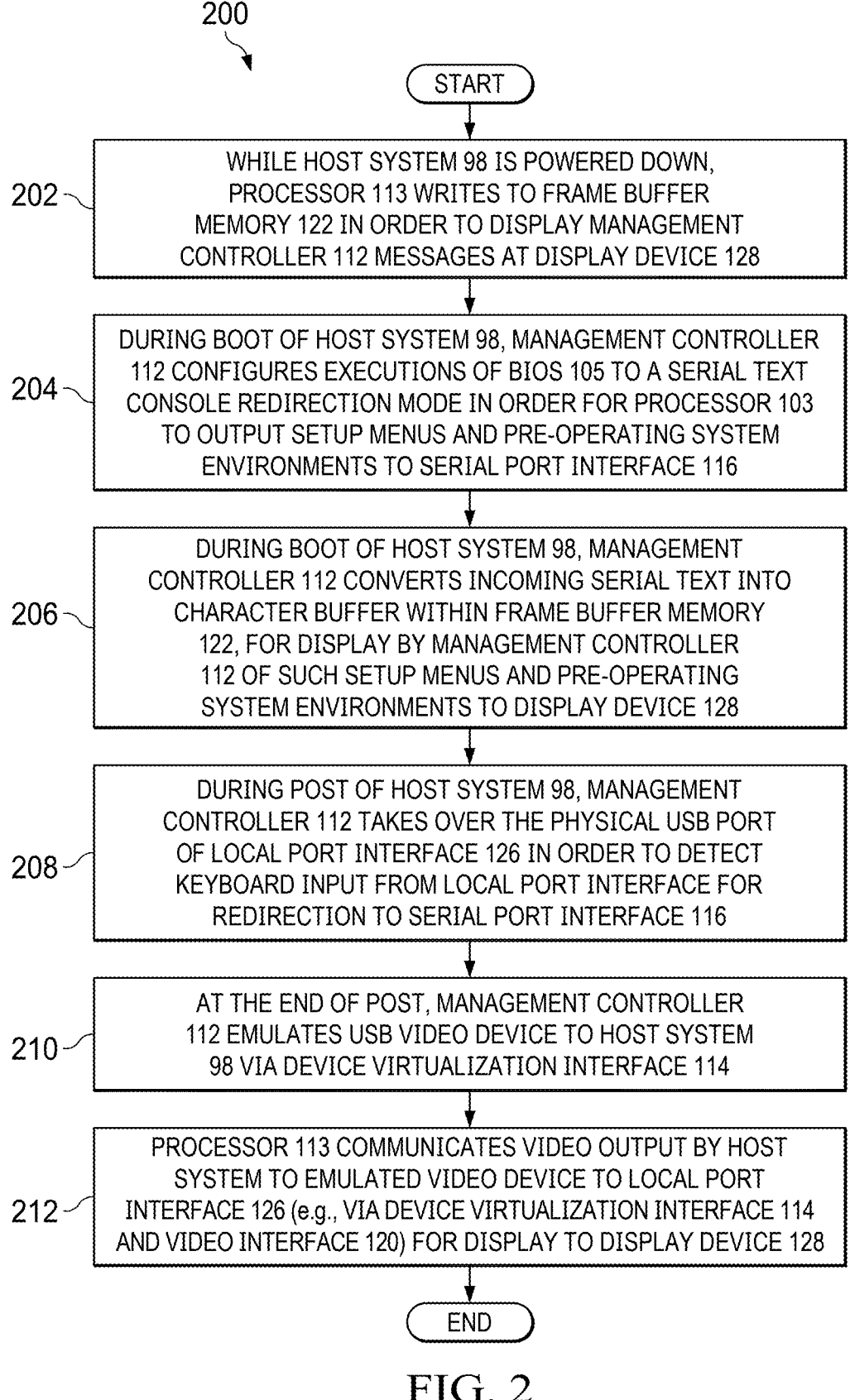
FIG. 2 illustrates a flow chart of an example method for virtual Universal Serial Bus video, Universal Serial Bus takeover, and serial console redirection in a management controller, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 comprising an information handling system 102 and a display device 128, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 112 communicatively coupled to processor 103, a frame buffer memory 122 communicatively coupled to processor 103 and management controller 112, a Universal Serial Bus (USB) multiplexer 124 communicatively coupled to processor 103 and management controller 112, and a local port interface 126 communicatively coupled to USB multiplexer 124 and management controller 112. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state. In certain embodiments, management controller 112 may include or may be an integral part of an embedded controller (EC), baseboard management controller (BMC), or a remote access controller (e.g., a Dell Remote Access Controller or Integrated Dell Remote Access Controller). In other embodiments, management controller 112 may include or may be an integral part of a chassis management controller (CMC). As shown in FIG. 1, management controller 112 may include a processor 113, device virtualization interface 114, serial port interface 116, USB host interface 118, and video interface 120.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), serial communications link, general purpose input/output (GPIO) channel and/or one or more other communications channels.

Device virtualization interface 114 may be communicatively interfaced between host system 98 (e.g., via USB) and processor 103 and may comprise any system, device, or apparatus configured to virtualize and/or emulate management controller 112 to processor 103 as one or more input/output devices, such as an emulated video device, emulated keyboard, emulated mouse, etc.

Serial port interface 116 may be interfaced between processor 103 and processor 113 and may comprise any system, device, or apparatus configured to serve as an interface for serial communication of data between processor 103 and processor 113, which has long been referred to in the art as a "COM," "serial COM," or "communications port."

USB host interface 118 may be communicatively coupled to processor 103 and may comprise any suitable system, device, or apparatus configured to facilitate USB communications between processor 113 and local port interface 126 (e.g., via USB multiplexer 124).

Video interface 120 may be communicatively coupled to frame buffer memory 122 and may comprise any system, device, or apparatus configured to convert an in-memory bitmap within frame buffer memory 122 into a video signal that can be displayed on a display device (e.g., display device 128).

As described in greater detail below, management controller 112 may function as a video controller during three states of host system 98: when host system 98 is powered off, when host system 98 is booting, and when host system 98 is in operating system runtime.

Frame buffer memory 122 may comprise random-access memory or any other suitable memory that comprises a bitmap that drives a video display. Accordingly, frame buffer memory 122 may comprise a memory buffer containing data representing all the pixels in a complete video frame.

USB multiplexer 124 may be coupled to local port interface 126 and may comprise any system, device, or apparatus configured to select among a plurality of input sources (e.g., host system 98 or management controller 112) for outputting a USB stream to local port interface 126 for display to display device 128.

Local port interface 126 may comprise any system, device, or apparatus configured to serve as an interface for coupling an electronic device (e.g., display device 128 and/or a management console device for management of host system 98 via management controller 112) to information handling system 102. For example, local port interface 126 may enable communicative coupling of display device 128 to information handling system 102 to further enable display of video data from video interface 120 of management controller 112 and/or video embedded in a USB stream from USB multiplexer 124.

In addition to processor 103, memory 104, BIOS 105, management controller 112, frame buffer memory 122, USB multiplexer 124, and local port interface 126, information handling system 102 may include one or more other information handling resources. In addition, although FIG. 1 shows information handling system 102 configured as what many would consider a computing system, in some embodiments, information handling system 102 may include fewer components than that often seen in a computing system, and may comprise a device with less functionality, such as a docking station or port replicator.

Display device 128 may include any system, device, or apparatus configured to generate graphical images and/or reproduce alphanumeric text for viewing by a user of information handling system 102, based on display data communicated to display device 128 from information handling system 102. Display device 128 may comprise a light-emitting diode display, liquid crystal display, and/or any other suitable display. In some embodiments, display device 128 may comprise or may be integral to a management console for managing host system 98 via management controller 112.

For clarity of exposition, FIG. 1 depicts only one host system 98. However, in some embodiments of system 100, system 100 may include a plurality of host systems 98 managed by management controller 112 and for which management controller 112 may act as a video controller as described above, thus enabling shared and scalable video display control.

FIG. 2 illustrates a flow chart of an example method 200 for virtual Universal Serial Bus video, Universal Serial Bus takeover, and serial console redirection in a management controller, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, while host system 98 is powered down, processor 113 may write to frame buffer memory 122 in order to display management controller 112 messages at display device 128.

At step 204, during boot of host system 98, management controller 112 may configure execution of BIOS 105 to a serial text console redirection mode (e.g., to draw American Standard Code for Information Interchange or "ASCII" characters instead of image pixels) in order for processor 103 to output setup menus and pre-operating system environments (e.g., UEFI shell) to serial port interface 116. At step 206, still during boot of host system 98, management controller 112 may convert the incoming ASCII text into a character buffer within frame buffer memory 122, for display by management controller 112 of such setup menus and pre-operating system environments to display device 128.

At step 208, during power-on/self-test (POST) of host system 98, management controller 112 may take over the physical USB port of local port interface 126 in order to detect keyboard input from local port interface 126 for redirection to serial port interface 116 (and thus communication of keyboard input to host system 98). In some embodiments, the physical port may include labeling to indicate to a user that the physical port has this redirection capability. A handshake in code of BIOS 105 may provide for handoff by USB multiplexer 124 of the physical port from being owned by host system 98 to be owned by management controller 112.

At step 210, at the end of POST, management controller 112 may emulate a USB video device to host system 98 via device virtualization interface 114. In response, host system 98 may discover the emulated USB video device and use the emulated video device for display output.

At step 212, processor 113 may communicate the video output by host system 98 to the emulated video device to local port interface 126 (e.g., via device virtualization interface 114 and video interface 120) for display to display device 128.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using information handling system 102 and/or any other system operable to implement method 200. In certain embodiments, method 200 may be implemented partially or fully in software and/or firmware embodied in computer-readable media.

Using the systems and methods disclosed herein, a management controller may act as video controller during three host states (off, booting, operating system runtime) of a host system without need of PCIe to provide video control and/or display. Further, a management controller make takeover a host-owned USB port to enable redirection of keyboard input to a serial console of the management controller. In addition, a BIOS of a host system and a management controller may act in concert to handshake in order to transition a host-owned physical port to a management controller-owned port.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:

a host system configured to boot an operating system; and a management controller communicatively coupled to the host system and configured to provide management facilities for management of the host system, the management controller further configured to, during a power-on/self-test of the host system:

in concert with a basic input/output system of the host system, perform a handshake to transition a port of the information handling system from a host system-owned port to a management controller-owned port such that the management controller takes ownership of the port to detect and redirect input from the port to a port of a serial console of the management controller that receives the input.

2. The information handling system of claim 1, wherein the port is a Universal Serial Bus Port.

3. The information handling system of claim 1, wherein the input is a keyboard input.

4. The information handling system of claim 1, wherein the management controller is configured to display video output to a display device coupled to the information handling system during three different host states of the host system.

5. The information handling system of claim 4, wherein the three different host states of the host system are a first state in which the host system is off, a second state in which the host system is booting to the operating system, and a third state in which the host system is in operating system runtime.

6. The information handling system of claim 5, wherein:

in the first state, the management controller writes to a frame buffer memory in order to display management control messages to the display device;

in the second state, the management controller converts incoming serial text from the host system into a character buffer of the frame buffer memory in order to display serial text to the display device; and in the third state, the management controller virtualizes an emulated video device to the host system, and in response to communication of video output from the host system to the emulated video device, displays the video output to the display device via the port.

7. A method comprising, in an information handling system comprising a host system configured to boot an operating system and a management controller communicatively coupled to the host system and configured to provide management facilities for management of the host system, the method comprising:

during a power-on/self-test of the host system:

in concert with a basic input/output system of the host system, performing, by the management controller, a handshake to transition a port of the information handling system from a host system-owned port to a management controller-owned port such that the management controller takes ownership of the port to detect and redirect input from the port to a port of a serial console of the management controller that receives the input.

8. The method of claim 7, wherein the port is a Universal Serial Bus Port.

9. The method of claim 7, wherein the input is a keyboard input.

10. The method of claim 7, further comprising displaying, by the management controller, video output to a display device coupled to the information handling system during three different host states of the host system.

11. The method of claim 10, wherein the three different host states of the host system are a first state in which the host system is off, a second state in which the host system is booting to the operating system, and a third state in which the host system is in operating system runtime.

12. The method of claim 11, wherein:

in the first state, the management controller writes to a frame buffer memory in order to display management control messages to the display device;

in the second state, the management controller converts incoming serial text from the host system into a character buffer of the frame buffer memory in order to display serial text to the display device; and in the third state, the management controller virtualizes an emulated video device to the host system, and in response to communication of video output from the host system to the emulated video device, displays the video output to the display device via the port.

13. An article of manufacture comprising:

a non-transitory computer-readable medium; and computer-executable instructions carried on the computer-readable medium, the instructions readable by a processor, the instructions, when read and executed, for causing the processor to, in a management controller communicatively coupled to a host system and configured to provide management facilities for management of the host system:

during a power-on/self-test of the host system:

in concert with a basic input/output system of the host system, perform a handshake to transition a port of an information handling system that includes the host system and the management controller from a host system-owned port to a management controller-owned port such that the management controller takes ownership of the port to detect and redirect input from the port to a port of a serial console of the management controller that receives the input.

14. The article of claim 13, wherein the port is a Universal Serial Bus Port.

15. The article of claim 13, wherein the input is a keyboard input.

16. The article of claim 13, the instructions for further causing the management controller to display video output to a display device coupled to the information handling system during three different host states of the host system.

17. The article of claim 16, wherein the three different host states of the host system are a first state in which the host system is off, a second state in which the host system is booting to the operating system, and a third state in which the host system is in operating system runtime.

18. The article of claim 17, wherein:

the first state, the management controller writes to a frame buffer memory in order to display management control messages to the display device;

in the second state, the management controller converts incoming serial text from the host system into a character buffer of the frame buffer memory in order to display serial text to the display device; and in the third state, the management controller virtualizes an emulated video device to the host system, and in response to communication of video output from the host system to the emulated video device, displays the video output to the display device via the port.

19. A method comprising, in an information handling system comprising a host system configured to boot an operating system and a management controller communicatively coupled to the host system and configured to provide management facilities for management of the host system:

displaying, by the management controller, video output to a display device coupled to the information handling system during:

a first state in which the host system is off, wherein the management controller writes to a frame buffer memory in order to display management control messages to the display device;

a second state in which the host system is booting to the operating system, wherein the management controller:

converts incoming serial text from the host system into a character buffer of the frame buffer memory in order to display setup menus and pre-operating system environments to the display device; and detects and redirects input from a port of the information handling system to a port of a serial console of the management controller that receives the input; and a third state in which the host system is in operating system runtime, wherein the management controller virtualizes an emulated video device to the host system, and in response to communication of video output from the host system to the emulated video device, displays the video output to the display device via the port.

* * * * *